United States Patent

Jänker et al.

Patent Number: 6,070,834
Date of Patent: Jun. 6, 2000

[54] AERODYNAMIC BODY WITH INTERNAL ACTUATING DRIVES

[75] Inventors: Peter Jänker, Garching; Felix Nitschké, München, both of Germany

[73] Assignee: DaimlerChrysler AG, Stuttgart, Germany

[21] Appl. No.: 08/994,682

[22] Filed: Dec. 19, 1997

[30] Foreign Application Priority Data

Dec. 21, 1996 [DE] Germany ............ 196 53 851

[51] Int. Cl.⁷ ............................................. B64C 3/44
[52] U.S. Cl. ................... 244/219; 244/215; 244/213
[58] Field of Search .................... 244/219, 213, 244/214, 215, 216, 217, 218

[56] References Cited

U.S. PATENT DOCUMENTS

| | | |
|---|---|---|
| 1,344,244 | 6/1920 | Patterson . |
| 1,856,578 | 5/1932 | Miguel et al. . |
| 2,650,047 | 8/1953 | Carhart et al. . |
| 3,179,357 | 4/1965 | Lyon . |
| 4,247,066 | 1/1981 | Frost et al. . |
| 4,349,169 | 9/1982 | McAnally . |
| 4,671,471 | 6/1987 | Patmont . |
| 5,538,202 | 7/1996 | Thornburg . |
| 5,839,698 | 11/1998 | Moppert . |

FOREIGN PATENT DOCUMENTS 1296994  5/1970  United Kingdom ............... 244/219

OTHER PUBLICATIONS

Navy Technical Catalog No. 0164, Navy Technical Disclosure Bulletin vol. 10, No. 4, Jun., 1985, pp. 101–106.

*Primary Examiner*—Peter M. Poon
*Assistant Examiner*—Tien Dinh
*Attorney, Agent, or Firm*—McGlew and Tuttle, P.C.

[57] ABSTRACT

A segment 1 of an aerodynamic body has as the internal actuating drive an actuator 7, which acts on an upper profile shell 2 with one working piston 9 and on a lower profile shell with a working piston 8 acting in the opposite direction to generate oppositely directed arches of the segment 1. The profile shells 2 and 3 are mounted displaceably in relation to one another in dovetail guides 4 and 5.

17 Claims, 2 Drawing Sheets

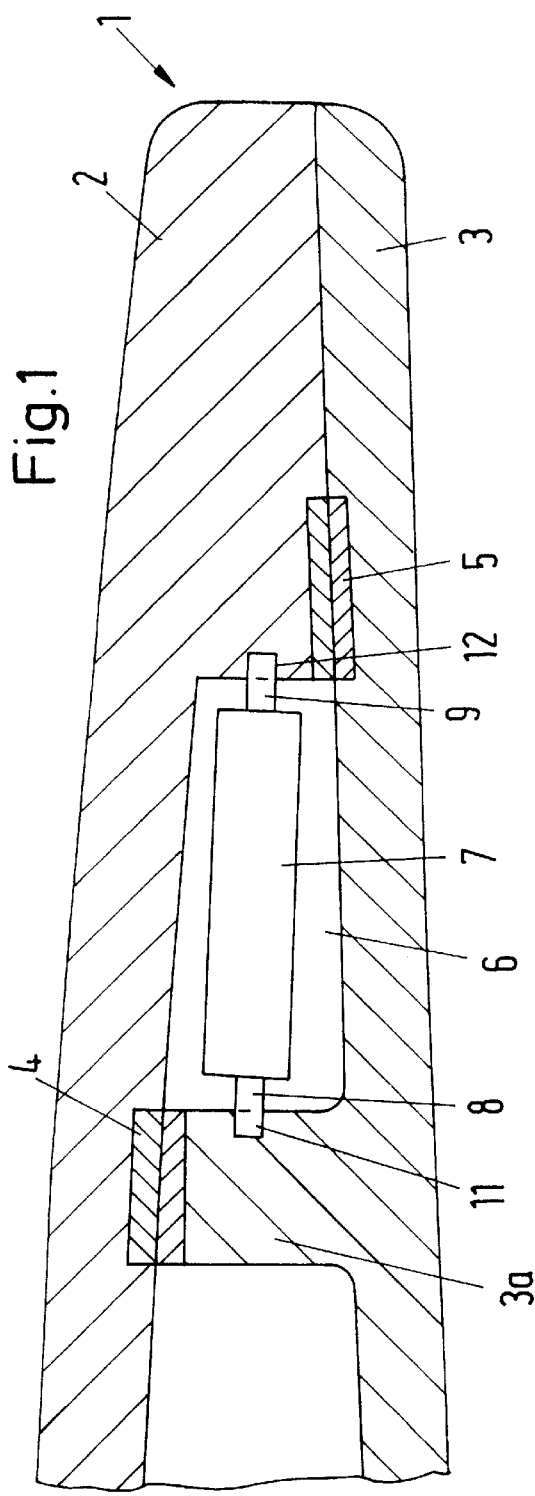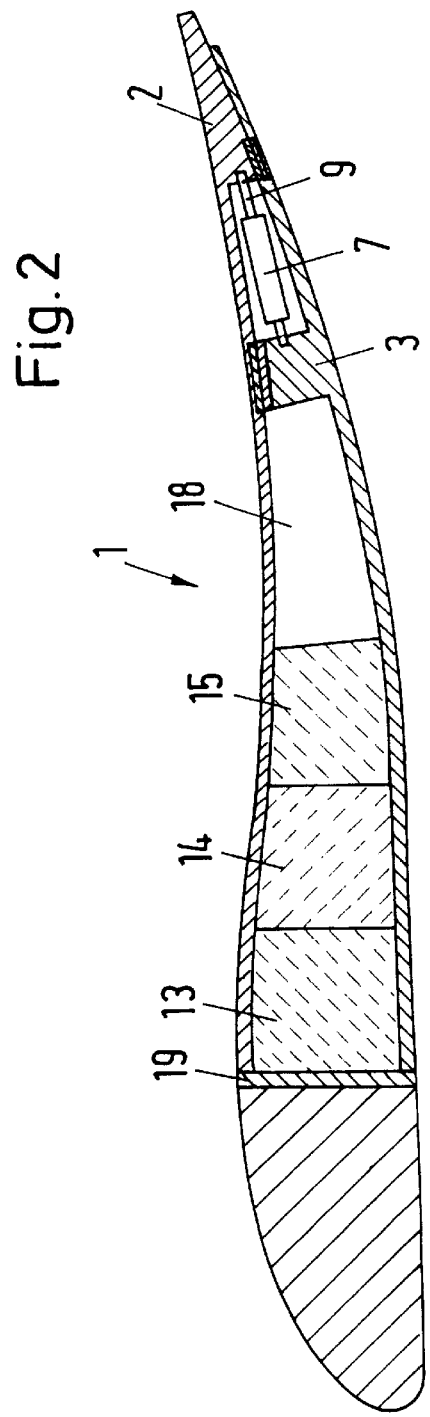

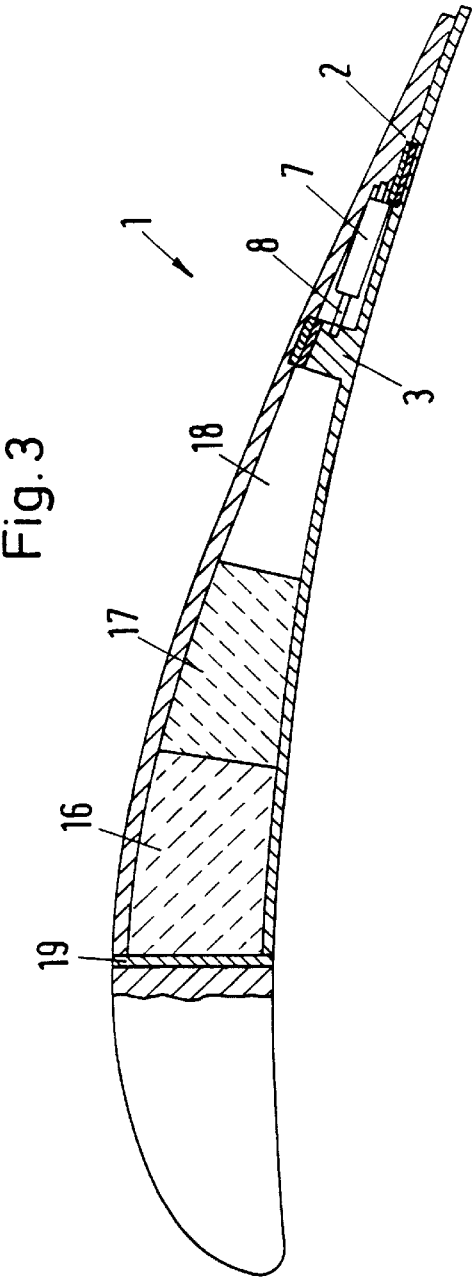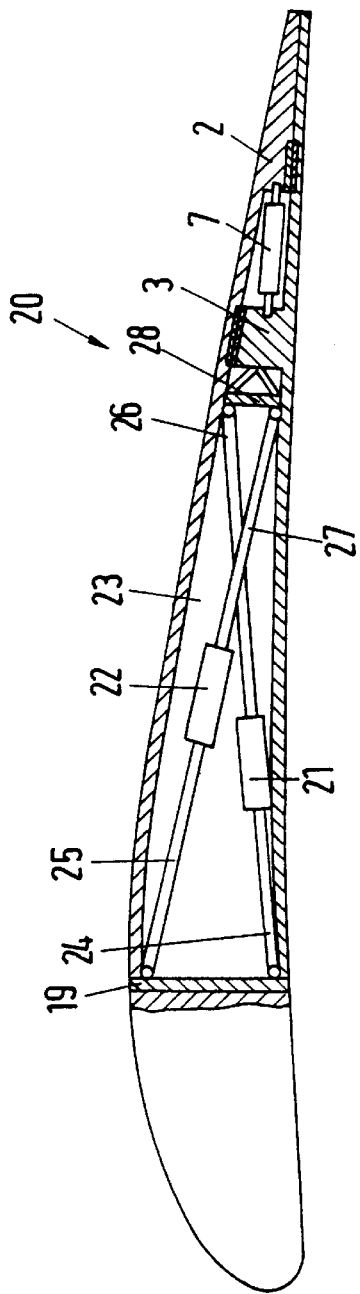

AERODYNAMIC BODY WITH INTERNAL ACTUATING DRIVES

FIELD OF THE INVENTION

The present invention pertains to an aerodynamic body with internal actuating drives for generating variable arches.

BACKGROUND OF THE INVENTION

An aerodynamic body is already known from U.S. Pat. No. 4,247,066, in which two beams, that can be adjusted in relation to one another in an articulated manner with threaded rods, are arranged in each segment. As a result of this a variable arch can be generated. The elastic profile skin slides on the beams and is also bent during their adjustment. The actuating drives used here require a considerable mechanical effort in terms of beams, threaded rods and ball joints.

SUMMARY AND OBJECTS OF THE INVENTION

The primary object of the present invention is to design an aerodynamic body of the type described in the introduction in a simpler and more reliably functioning form.

According to the invention, an aerodynamic body is provided with internal actuating drives for generating variable arches. At least one actuator is provided as an actuating drive which acts on an upper profile shell with a working piston and on a lower profile shell with a working piston, acting in the opposite direction. The profile shells are arranged displaceably in relation to one another.

One actuator is preferably arranged per body segment in the vicinity of the rear edge. The profile shells are preferably able to slide on one another by means of dovetail guides.

In the space before said actuator, the profile shells may be completely or partially connected to foam material, wherein a said space, which is mostly curved during the arching of the segment, is free from foam material.

To support the one actuator at the rear edges of a segment, two additional actuators, which are mutually connected to the said profile shells and to a front spar, are preferably provided in a space in the middle of said segment.

The profile shape of an aerodynamic body can be adjusted continuously by actuators with a lower working energy by means of the actuating drives according to the present invention. The profile shells are subjected to bending and absorb only a small amount of elastic energy because of their geometric shape. Thus, only a small amount of adjusting energy is to be generated with the actuators, which also absorb the longitudinal forces. The actuators are preferably arranged in the vicinity of the rear edge in each segment of the aerodynamic body. The profile shells can slide on one another by means of dovetail guides, which absorb the lateral forces.

To achieve a high inherent stability, the profile shells in the space between the profile shells before the actuator are completely or partially connected to foam material, which is subjected to shear during the adjustment. Areas of high shear deformation due to the arch of the aerodynamic body may be kept free from foam material in order to avoid the generation of excessive elastic forces and material failure. If necessary, the profile shells may be reinforced or be stiffened with stringers in this area in order the prevent an unacceptable bulging out at right angles to the chord of the profile of the body under air load. In the case of very large and rigid aerodynamic bodies, two additional actuators, which cooperate in generating the arch, may also be arranged in the space between the actuator at the rear edge and a spar arranged in the front half of the body, which are mutually connected to the profile shells and to the spar.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a sectional view of the rear edge of a segment of an aerodynamic body with a built-in actuator;

FIG. 2 is an entire segment of the body according to FIG. 1 with upwardly arched rear edge;

FIG. 3 is the segment according to FIG. 2 with downwardly arched rear edge; and

FIG. 4 is a segment of an aerodynamic body, in which two additional actuators are arranged in the middle.

DESCRIPTION OF THE PREFERRED EMBODIMENTS

Referring to the drawings in particular, the invention comprises an upper profile shell 2 and a lower profile shell 3, which are able to slide on one another by means of dovetail guides 4 and 5. The profile shells are present in the rear edge of a segment 1 of an aerodynamic body. The upper profile shell 2 includes an upper aerodynamic body skin. The lower profile shell 3 includes a lower aerodynamic body skin. By an attachment 3a, the lower profile shell 3 forms a hollow space 6 with the upper profile shell 2. An actuator 7 is mounted in this hollow space 6. At both ends, the actuator 7 has working pistons 8 and 9, which can be extended, e.g., hydraulically, and they engage openings 11 and 12 of the profile shells 3 and 2. The opening 11 is formed in a lower profile shell portion of lower profile shell 3 extending away from the lower aerodynamic body skin (e.g., into the interior of the connected shells). The opening 12 is formed in an upper profile shell portion of upper profile shell 2 extending away from the upper aerodynamic body skin (e.g., into the interior of the connected shells). When the working piston 9 is extended, as is shown in FIG. 2, the profile shell 2 is pressed upward, as a result of which the aerodynamic body 1 arches upward. When the working piston 8 is being extended, it acts on the profile shell 3, as a result of which the segment 1 of the aerodynamic body arches downward, corresponding to FIG. 3. The profile shells 2 and 3 slide on one another in both cases by means of the dovetail guides, which also act as supports at the same time.

FIGS. 2 and 3 also show that supports 13 through 17 made of foam material, which are subjected to shear during the adjustment of the profile shells 2 and 3, are arranged in the space between the profile shells 2 and 3 before the actuators 7. The space 18 of high shearing stress behind the actuator 7 is advantageously kept free. The profile shells 2 and 3 are connected to a spar 19 in the front part of the segment 1.

FIG. 4 shows a segment 20 of another aerodynamic body, in which two additional actuators 21 and 22 are also built in in the space 23 in the middle of the segment 20, besides the actuator 7 at the rear edge. The actuators 21 and 22 are supported on one side at the spar 19 with rods 24 and 25 and have working pistons 26 and 27 of increased length, with which they are able to act on the profile shells 2 and 3 to generate the desired arch of the profile. The segment 20 is also provided with a reinforcement 28.

While specific embodiments of the invention have been shown and described in detail to illustrate the application of the principles of the invention, it will be understood that the invention may be embodied otherwise without departing from such principles.

What is claimed is:

1. An aerodynamic body, comprising:
   a lower profile shell including a lower aerodynamic body skin and an integral lower profile shell portion;
   an upper profile shell including an upper aerodynamic body skin and an integral upper profile shell portion, said lower profile shell and said upper profile shell cooperating to define an interior; said integral lower profile shell portion extending into said interior and said integral upper profile shell portion extending into said interior and
   an internal actuating drive, disposed in said interior, said drive for acting on said upper profile shell with a working piston and for acting on said lower profile shell with another working piston acting in the opposite direction, wherein the profile shells are arranged displaceably in relation to one another wherein selective actuation of said working piston and said another working piston vary shapes of arches defined by said lower aerodynamic body skin and said upper aerodynamic body skin.

2. The aerodynamic body in accordance with claim 1, wherein said lower profile and said upper profile shell are part of a body segment.

3. The aerodynamic body in accordance with claim 1, further comprising shell guide means including dovetail guides, wherein said profile shells are able to slide on one another by means of said dovetail guides.

4. The aerodynamic body in accordance with claim 1, wherein said upper profile shell and said lower profile shell cooperate to form a space before said internal actuating drive and said upper profile shell and said lower profile shell are completely or partially connected to foam material, wherein said space before said internal actuating drive, which is mostly curved during an arching of said segment, is free from said foam material.

5. The aerodynamic body in accordance with claim 2, further comprising:
   a space defined in said interior of said segment; and
   two additional actuators mutually connected to said upper profile shell and said lower profile shell and to a front spar, to support said internal actuating drive disposed at rear edges of said segment, said additional actuators being provided in said space in said middle of said segment.

6. An aerodynamic body, comprising:
   a body segment with
   a lower profile shell including integral lower aerodynamic body skin and an integral lower profile shell portion,
   an upper profile shell including integral upper aerodynamic body skin and an integral upper profile shell portion, said lower profile shell and said upper profile shell cooperating to define an interior said integral lower profile shell portion extending into said interior and said integral upper profile shell portion extending into said interior, and
   an internal actuating drive disposed in said interior for generating variable arches with at least one actuator which acts directly on said upper profile shell portion with a working piston and acts directly on said lower profile shell portion with another working piston acting in the opposite direction, wherein the profile shells are arranged displaceably in relation to one another.

7. The aerodynamic body in accordance with claim 6, wherein said actuator is arranged in a vicinity of a rear edge.

8. The aerodynamic body in accordance with claim 6, further comprising shell guide means including dovetail guides, wherein said profile shells are able to slide on one another by means of said dovetail guides.

9. The aerodynamic body in accordance with claim 6, wherein said upper profile shell and said lower profile shell cooperate to form a space before said actuator and said upper profile shell and said lower profile shell are completely or partially connected to foam material, wherein said space before said actuator, which is mostly curved during an arching of said segment, is free from said foam material.

10. The aerodynamic body in accordance with claim 6, further comprising:
    a space in the middle of said segment; and
    two additional actuators mutually connected to said upper profile shell and said lower profile shell and to a front spar, to support said internal actuating drive disposed at rear edges of said segment, said additional actuators being provided in said space in said middle of said segment.

11. An aerodynamic body, comprising:
    a lower profile shell including a lower aerodynamic body skin and an integral lower profile shell portion extending away from said lower aerodynamic body skin;
    an upper profile shell including an upper aerodynamic body skin and an integral upper shell portion extending away from said lower aerodynamic body skin, said lower profile shell and said upper profile shell cooperating to define an interior, said lower profile shell portion extending into said interior and said upper profile shell portion extending into said interior;
    an actuating drive, disposed in said interior, said drive having a working piston acting on said lower profile shell portion and having a working piston acting on said upper profile shell portion; and
    a sliding connection between said lower profile shell and said upper profile shell.

12. The aerodynamic body in accordance with claim 11, wherein said lower profile shell and said upper profile shell are part of a body segment and one said actuating drive is arranged per said body segment in the vicinity of a rear edge of said body segment.

13. The aerodynamic body in accordance with claim 11, wherein said sliding connection includes dovetail guides, wherein said profile shells are able to slide relative to one another.

14. The aerodynamic body in accordance with claim 12, wherein said upper profile shell and said lower profile shell cooperate to form a space before said actuating drive and said upper profile shell and said lower profile shell are completely or partially connected to foam material, wherein said space before said actuator, which is mostly curved during an arching of said segment, is free from foam material.

15. The aerodynamic body in accordance with claim 12, further comprising:
    a space defined in said interior of said segment; and
    two additional actuators mutually connected to said upper profile shell and said lower profile shell and to a front spar, to support said actuating drive disposed at rear edges of said segment, said additional actuators being provided in said space in said middle of said segment.

16. The aerodynamic body according to claim 11, wherein
    said sliding connection is adjacent to a trailing edge of the aerodynamic body.

17. The aerodynamic body according to claim 6, wherein
    said displaceable arrangement between said lower profile shell and said upper profile shell includes a sliding connection adjacent to a trailing edge of the aerodynamic body.

* * * * *